Dec. 11, 1934.  L. V. FOSTER  1,984,123
LENS TESTING INSTRUMENT
Filed April 26, 1933
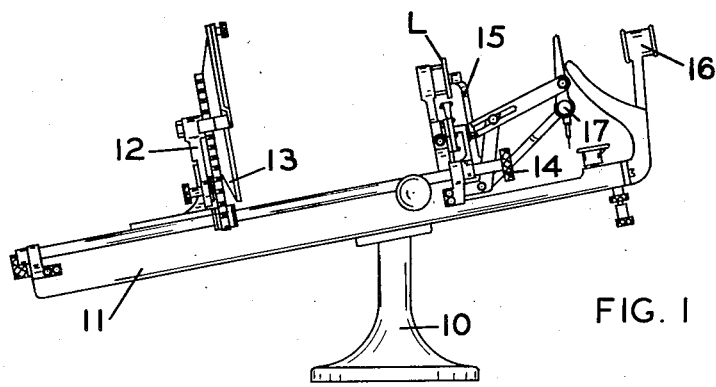
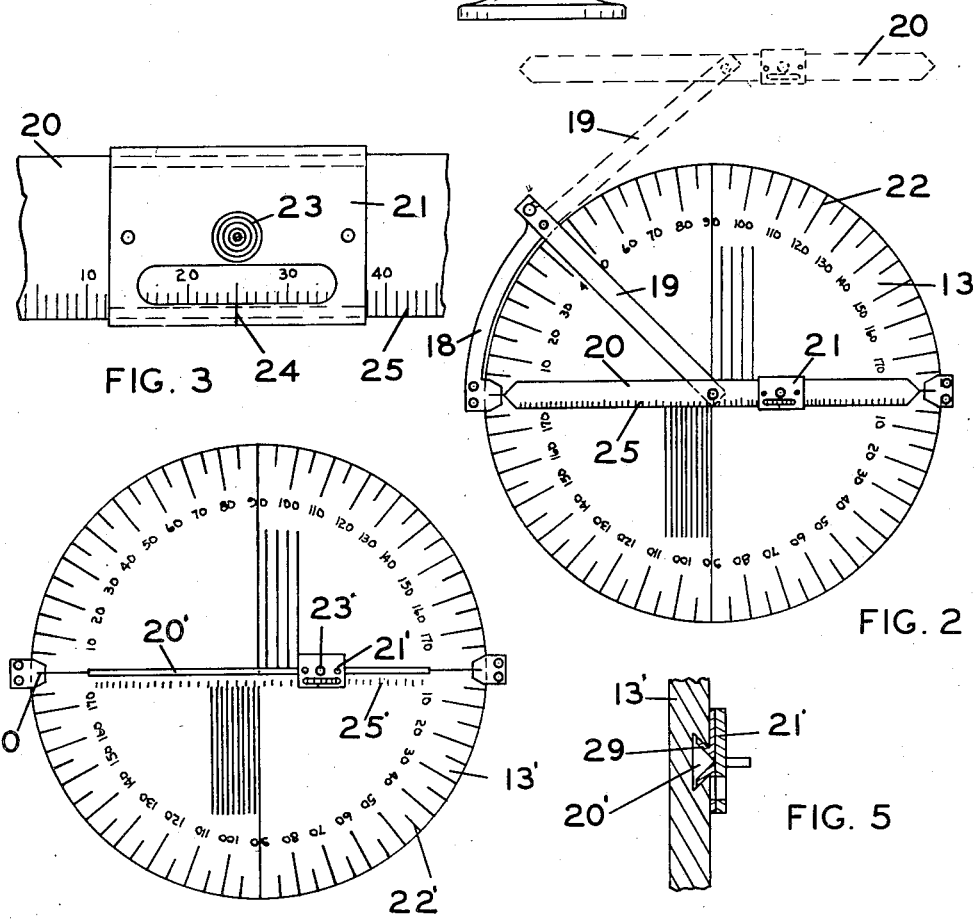
LEON V. FOSTER
INVENTOR
BY *J. A. Ollestad*
ATTORNEY Patented Dec. 11, 1934

1,984,123

UNITED STATES PATENT OFFICE 1,984,123

LENS TESTING INSTRUMENT

Leon V. Foster, Irondequoit, N. Y., assignor to Bausch & Lomb Optical Company, Rochester, N. Y., a corporation of New York Application April 26, 1933, Serial No. 668,052

9 Claims. (Cl. 88—56)

This invention relates to optical instruments and more particularly it has reference to instruments which are used for determining and/or locating the optical center, cylindrical axis, prism power and prism axis of lenses.

One of the objects of my invention is to provide an improved instrument for determining the amount of prism power in a lens and locating the base-apex line or prism axis of a lens. Another object is to provide an attachment for a lens testing instrument whereby the prism power and axis of a lens can be readily determined and measured with a minimum of time and effort. These and other objects and advantages reside in certain novel features of construction, arrangement and combination of parts as will hereinafter be more fully explained.

Referring to the drawing:

Fig. 1 is a side view of one type of lens testing instrument embodying my invention.

Fig. 2 is an enlarged view showing the method of mounting the radius beam adjacent to the plate.

Fig. 3 is an enlarged view of the slidable target member.

Fig. 4 is a view of a modification.

Fig. 5 is an enlarged sectional view showing a constructional detail of the modification.

A preferred embodiment of my invention is illustrated in Fig. 1 as applied to one type of lens testing instrument. This instrument comprises the base 10 carrying the longitudinal bed 11 on which is slidably mounted a bracket 12 which supports a plate 13 which can be rotated by turning knob 14. The bed also carries a suitable chuck 15 for holding a lens L which is to be tested. The instrument is provided with the usual eye piece 16 as well as an inking device 17 for marking the optical center or cylinder axis of the lens under test. These various elements characterize the instruments of the prior art and since their function is well understood to those skilled in the art, a detailed description will be omitted.

Secured to the bracket 12 is a member 18 on which is pivotally mounted an arm 19. Rotatably mounted at the end of arm 19 is a radius beam 20 on which is slidably monuted a target member 21. The arm 19 can be swung down in front of plate 13 so that the radius beam 20 is in the position shown in Fig. 2 with its axis substantially coincident with the axis of plate 13. When not in use the arm 19 together with the radius beam can be swung up to the dotted line position shown in Fig. 2. The front face of plate 13 is provided with the usual circular scale 22. The target member 21 carries a target 23 which comprises a series of concentric circles as shown in Fig. 3. The target member 21 also carries an index line 24 which cooperates with a millimeter scale 25 which is provided along the edge of radius beam 20.

In operation of my device the lens L to be tested is placed in the chuck 15 and rotated until its cylinder axis is positioned substantially horizontally along the 180 degree line. In case the lens has a relatively large amount of prism power it may be necessary to use a supplementary neutralizing prism, as will be understood by those skilled in the art. The bracket 12 is then moved along bed 11, which is graduated in accordance with the distance from the lens chuck as 50, 100, 200, 250 etc. millimeters, and the plate 13 is positioned at the graduation where the target appears to be focused or nearly so. The cylinder axis of the lens is then marked on the lens with the inking device. The radius beam 20 is swung down in front of plate 13 and turned and target member 21 is moved along the radius beam until the center ink dot on the lens is substantially centered with respect to the target 23. The angle which the radius beam 20 is then making with the horizontal can be read directly from scale 22 on plate 13. This angle will give the location of the prism axis or base-apex line with respect to the cylinder axis. The scale 25 will give, in millimeters, the location of the target member 21 relative to the center of the radius beam. This can be converted into prism diopters by knowing the distance in millimeters from the lens to be the target. If the target is 100 mm. from the lens and if the target member 21 is 10 mm. from the center of the radius beam, the lens has a prism power of 10 prism diopters. If the distance from target to lens is 400 mm. and the target member 21 is 10 mm. from the center of the radius beam the lens has a power of 2.5 prism diopters.

A modification of my invention is shown in Figs. 4 and 5 wherein 13' is a rotatably mounted plate bearing a circular scale 22'. Formed in the face of the plate and along a diameter thereof is a longitudinal groove 20' in which is slidably mounted the resilient portions 29 formed on the rear of a target member 21'. A millimeter scale 25' is provided on the face of plate 13' along the groove 20'. The use of this modified form is similar in all respects to that described above for the other form excepting that instead of rotating the radious beam the entire plate 13' is rotated and the target member 21' moved along until the center ink dot is substantially centered with respect to the target marking 23'. The angle which the base-apex line makes with the cylinder axis is then indicated by the angle through which the plate 13' has been turned with respect to the fixed index line 30.

From the foregoing it will be apparent that I am able to attain the objects of my invention and provide an instrument whereby the prism power and axis of a lens can be readily determined. Various modifications can obviously be made without departing from the spirit of my invention.

I claim:

1. A lens testing instrument comprising a base, longitudinal guide means mounted on said base to turn about an axis, a target member movably mounted on said guide means, scale means carried by said base for indicating the angular position of said guide means and means on said base for holding a lens before said guide means.

2. A lens testing instrument comprising a base, a lens holder mounted on said base and means mounted on said base for determining the prism power and axis of a lens on said holder, said means comprising longitudinal guide means mounted to turn about an axis, a target member movably mounted on said guide means, scale means for indicating the position of said target member on said guide means and scale means for indicating the angular position of said guide means.

3. In an instrument of the type described, the combination of a bed, longitudinal guide means mounted on said bed to turn about an axis which is substantially parallel to said bed, a target member slidably mounted on said guide means, means on said bed for holding a lens before said target member and scale means for indicating the angular position of said guide means with respect to the horizontal plane of said axis.

4. In a lens testing instrument of the type described, the combination of a bed carrying a plate bearing a protractor scale, a target member slidably mounted to move along a diameter of said plate, means on said bed for holding a lens in front of said target member and plate and eyepiece means for viewing said target member through the lens.

5. In an instrument of the type described, the combination of a bed carrying a plate element, a longitudinal guide element positioned in a diametral plane of said plate element, means for angularly moving one of said elements with respect to the other, a target member slidably mounted on said guide element and scale means for indicating the angular motion between said elements and means on said bed for holding a lens before said plate and member.

6. In an instrument of the type described, the combination of a bed, a plate mounted on said bed to turn about an axis, a radius beam rotatably mounted adjacent to said plate, the rotation axes of said plate and beam being substantially coincident, a target member slidably mounted on said beam, and scale means on said plate for indicating the angular position of said radius beam.

7. In an instrument of the type described, the combination of a bed, a circular plate mounted on said bed to turn about an axis which is substantialy parallel to said bed, an arm mounted on said bed adjacent to said plate, a radius beam rotatably mounted on said arm directly in front of said plate, the rotation axes of said plate and beam being substantially coincident, a target member slidably mounted on said beam, scale means on said beam for indicating the position of said target member and scale means on said plate for indicating the angular position of said beam relative to the horizontal axial plane of said plate.

8. A lens testing instrument comprising a bed, a circular plate mounted on said bed to turn about an axis which is parallel to said bed, an arm pivotally mounted on said bed and adapted to be selectively positioned adjacent to and in front of said plate, a radius beam rotatably mounted on said arm, the rotation axes of said plate and beam being coincident, a target member slidably mounted on said beam, scale means on said plate for indicating the amount of rotation of said beam, a lens holder mounted on said bed in spaced relation to said target member and means for varying the distance between said holder and said target member.

9. In an instrument of the type described the combination of a bed, a plate mounted on said bed to turn about an axis, guide means carried by said plate along a diameter thereof, a target member slidably mounted on said guide means, lens holding means mounted on said bed in front of said plate and scale means for indicating the amount of rotation of said plate.

LEON V. FOSTER.